United States Patent [19]

Goy

[11] Patent Number: 4,743,138

[45] Date of Patent: May 10, 1988

[54] DEVICE FOR COUPLING TWO FLANGED SHAFT ENDS

[75] Inventor: Pierre Goy, Sarcelles, France

[73] Assignee: Alsthom, Paris, France

[21] Appl. No.: 34,513

[22] Filed: Apr. 6, 1987

Related U.S. Application Data

[62] Division of Ser. No. 832,203, Feb. 24, 1986, Pat. No. 4,685,188.

[51] Int. Cl.⁴ ............................ F16D 9/00; F16B 2/14
[52] U.S. Cl. ...................................... 403/337; 403/370; 403/371; 403/16; 411/55; 411/63; 411/389
[58] Field of Search ................. 403/337, 16, 370, 368, 403/371, 335, 314; 411/55, 45, 63, 64, 389, 426, 271, 367

[56] References Cited

U.S. PATENT DOCUMENTS

| | | | |
|---|---|---|---|
| 3,173,522 | 3/1965 | Zimmer et al. | 403/337 |
| 3,909,916 | 10/1975 | Neff et al. | 411/389 X |
| 4,192,621 | 3/1980 | Barth | 403/337 X |
| 4,304,502 | 12/1981 | Stratienko | 403/370 |
| 4,367,053 | 1/1983 | Stratienko et al. | 403/371 |
| 4,496,259 | 1/1985 | Foucher | 403/16 X |
| 4,607,971 | 8/1986 | Hartmann et al. | 403/337 X |
| 4,610,064 | 9/1986 | Verstraeten | 411/426 X |

Primary Examiner—Randolph A. Reese
Assistant Examiner—Peter M. Cuomo
Attorney, Agent, or Firm—Sughrue, Mion, Zinn, Macpeak and Seas

[57] ABSTRACT

A coupling device for two flanged shaft ends is disclosed. A tapered pin bolt having a conical shank is employed within a complementary, internally tapered expansion sleeve having longitudinal slit. The pin bolt and sleeve extend through aligned bores provided in the flanges. The pin bolt is externally threaded on its opposite ends extending from the conical shank. A nut having an internal, axially extending and pin arrangement is mounted over each respective end of the pin bolt.

1 Claim, 2 Drawing Sheets

DEVICE FOR COUPLING TWO FLANGED SHAFT ENDS

This is a division of application Ser. No. 832,203, filed Feb. 24, 1986, now U.S. Pat. No. 4,685,188.

FIELD OF THE INVENTION

This invention relates to coupling two flanged shafts end-to-end by means of taper pin bolts and expansion sleeves cooperating with the pin bolts and having the same conicity, said sleeves extending into bores provided in the flanges and the pin bolts having external threads on both ends, a first end being located beyond the small end of the cone and a second end beyond the large end of the cone.

BACKGROUND OF THE INVENTION

Such a coupling device is already known from U.S. Pat. No. 4,192,621.

In this known coupling device, each pin bolt transfers both the torsional moments and the bending moments.

For purposes of installing these pins and in any case for removing them, their conical shank has been provided with circumferential grooves supplied with a fluid under pressure to push the sleeve out from the conical shank part of the pin. This device complicates manufacture.

SUMMARY OF THE INVENTION

The coupling device according to the present invention comprises of a taper pin bolt, an expandable conical sleeve having internally the same conicity as the pin and externally a cylindrical shape. The pin bolt is provided with a nut and a tractive grip at each end. A standoff is provided between the nut on the first end of the pin and the sleeve. The standoff bears upon the sleeve and is urged toward the sleeve by means of screws traversing the nut, and wherein the sleeve is longitudinally slit.

BRIEF DESCRIPTION OF THE DRAWINGS

The invention will be more readily understood in the light of the following description, with reference to the appended drawings.

DESCRIPTION OF THE PREFERRED EMBODIMENTS

Figure 1:
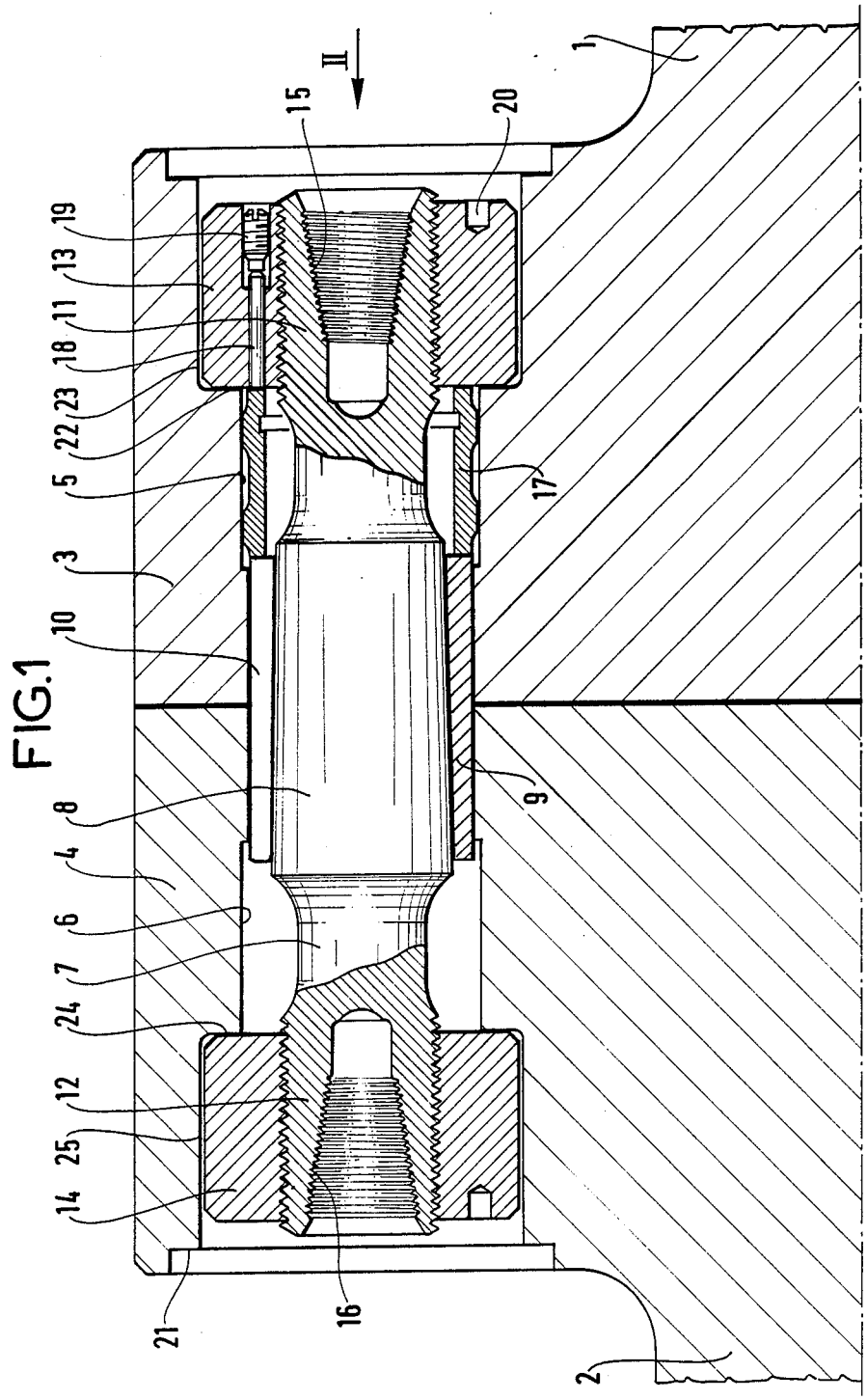
FIG. 1 shows a longitudinal section through the coupling device.

The device according to the invention serves to couple two shafts 1 and 2, each having a flange 3, 4.

Each flange 3, 4 has bores such as 5 and 6 which correspond with bores in its facing flange.

The device comprises a pin bolt 7 with a tapered center portion or shank 8. The shank 8 fits into a sleeve 9 having a longitudinal slit 10.

The sleeve 9 is internally tapered with the same conicity as the shank 8 of the pin bolt 7 and is cylindrical on the outside.

The pin bolt 7 has a first end 11 on the small side of its cone and a second end 12 on the large side of its cone.

Each end 11, 12 is threaded and receives a nut 13, 14. Moreover, each end 11, 12 has a tapped axial, conical bore 15, 16 designed to receive, when required, a gripping member attached to a hydraulic pulling cylinder.

Between the nut 13 screwed onto the first end of the pin bolt 11 and the sleeve 9 is a standoff 17 which bears against the sleeve 9 and is urged forward by three smaller pins 18 pushed by screws 19 in the nut 13.

Figure 2:
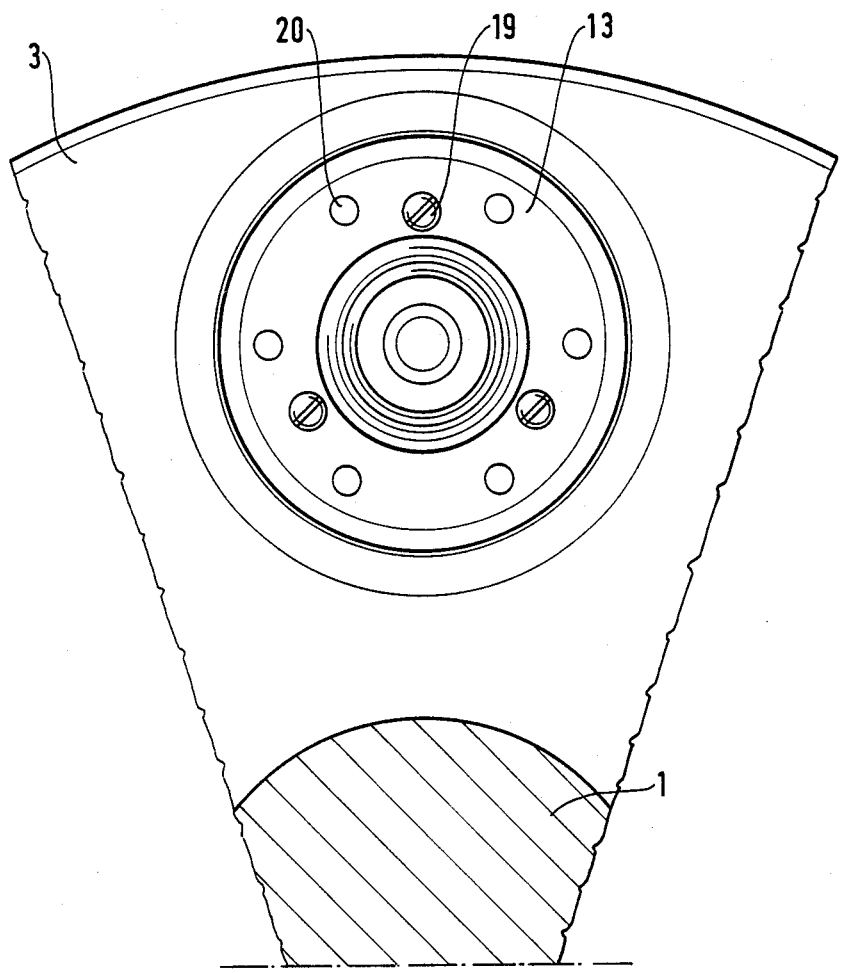
FIG. 2 shows a partial end view of the device in FIG. 1.

The nuts 13, 14 are equipped with cylindrical holes 20 to provide a grip for their screwing and unscrewing (see FIG. 2).

The operation of the coupling device is as follows.

The pin bolt 7, sleeve 9, standoff 17 and nuts 13, 14 assembly is inserted into the flange bores as illustrated in FIG. 1 such that the sleeve 9 straddles the two flange bores 5 and 6 of flanges 3 and 4, the slit 10 in the sleeve being placed at the top of the coupling.

A hydraulic cylinder comes to exert a force between the conical tapping 16 in the second end 12 of the pin bolt and the face 21 of the flange 4.

Since the nut 13 screwed onto the first end 11 of the pin bolt applies against the bottom 22 of a countersink 23 in flange 3, the tractive effort applied to the other end brings about an elongation of the pin 7 such that, due to the effectivity of Poisson's ratio, the diameter of the cone shrinks and a radial clearance is created between the conical surfaces of the pin 7 and the sleeve 9. The second nut 14 is then screwed up to apply to the bottom 24 of the countersink 25 in the flange 4 containing said nut 14.

To eliminate the play associated with axial movement of the sleeve 9 in relation to the pin 7, in the direction from the small end of the taper pin to the large end, the screws 19 of nut 13 are then screwed in, pushing the small straight pins 18 to urge back the standoff 17. Hydraulic pressure is thereafter removed from the cylinder and the cylinder withdrawn.

To uncouple the shafts, it is only necessary to refit the cylinder to the second end 12 of the pin bolt 7 and to exert a force enabling the nut 14 to be unscrewed.

If necessary, the cylinder can be dismantled and installed at the opposite end of the coupling to exert a force via the conical tapping 15.

The nut 14 is removed. A slight hydraulic pressure in the cylinder enables the sleeve 9 to be released from the holes 5 and 6. The cylinder is removed, then the pin bolt 7 and sleeve 9 assembly is removed after unscrewing the nut 13, pushing the pin bolt 7 in the direction of the first end 11 to the second end 12.

What is claimed is:

1. Coupling device for coupling two flanged shafts end-to-end having abutting flanges with aligned bores therein, said device comprising a cone-shaped taper pin bolt having a conical shank with opposite small and large diameter ends, an expandable cylindrical sleeve within said aligned bores and concentrically about said taper pin bolt conical shank, said sleeve having internally a conical surface matching said conical shank of the pin bolt, said pin bolt being provided with a nut and a tractive grip at each end, and an axially movable standoff provided concentrically about said pin bolt between the nut on the pin bolt and the small end of the conical shank and the sleeve, said standoff having one end bearing upon said sleeve and another end facing said nut and being urged axially toward said sleeve by means of screws traversing said nut and respectively abutting axially aligned pins contacting the other end of said standoff, and said sleeve being longitudinally slit.

* * * * *